(12) United States Patent
Kamen et al.

(10) Patent No.: US 7,017,686 B2
(45) Date of Patent: Mar. 28, 2006

(54) HYBRID HUMAN/ELECTRIC POWERED VEHICLE

(75) Inventors: Dean L. Kamen, Bedford, NH (US); John M. Kerwin, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 10/459,173

(22) Filed: Jun. 11, 2003

(65) Prior Publication Data

US 2003/0226698 A1 Dec. 11, 2003

Related U.S. Application Data

(60) Provisional application No. 60/387,641, filed on Jun. 11, 2002.

(51) Int. Cl.
*B62D 57/00* (2006.01)

(52) U.S. Cl. .................................................. 180/7.1

(58) Field of Classification Search ............... 180/282, 180/271, 7.1, 21, 218
See application file for complete search history.

(56) References Cited

U.S. PATENT DOCUMENTS

| | | | | |
|---|---|---|---|---|
| 3,399,742 A | | 9/1968 | Malick | 180/21 |
| 3,807,085 A | * | 4/1974 | Campbell, Jr. | 446/273 |
| 3,869,011 A | | 3/1975 | Jensen | 180/9.24 |
| 3,876,025 A | * | 4/1975 | Green | 180/21 |
| 4,050,533 A | * | 9/1977 | Seamone | 180/6.5 |
| 4,241,931 A | * | 12/1980 | Healy | 280/205 |
| 4,247,127 A | | 1/1981 | Wilkes | 280/28.5 |
| 4,324,414 A | | 4/1982 | Wilkes | 280/242 WC |
| 4,566,707 A | | 1/1986 | Nitzberg | 180/8.2 |
| 4,979,582 A | | 12/1990 | Forster | 180/20 |
| 5,121,806 A | | 6/1992 | Johnson | 180/65.5 |
| 5,390,753 A | * | 2/1995 | Parker | 180/19.1 |
| 5,701,965 A | | 12/1997 | Kamen et al. | 180/7.1 |
| 5,735,363 A | | 4/1998 | Horovitz et al. | 180/205 |
| 5,895,065 A | | 4/1999 | Khomo | 280/221 |
| 5,971,091 A | | 10/1999 | Kamen et al. | 180/218 |
| 5,975,225 A | | 11/1999 | Kamen et al. | 180/7.1 |
| 5,984,038 A | | 11/1999 | Fujiwara et al. | 180/206 |
| 6,003,624 A | | 12/1999 | Jorgensen et al. | 180/6.5 |
| 6,155,367 A | * | 12/2000 | Alber | 180/65.5 |
| 6,179,076 B1 | | 1/2001 | Fernie et al. | 180/65.1 |
| 6,288,505 B1 | * | 9/2001 | Heinzmann et al. | 318/139 |
| 6,302,226 B1 | * | 10/2001 | Kanno et al. | 180/6.5 |
| 6,332,103 B1 | * | 12/2001 | Steenson et al. | 701/1 |
| 6,377,906 B1 | * | 4/2002 | Rowe | 702/151 |

(Continued)

FOREIGN PATENT DOCUMENTS

FR 2 620 540 3/1989

(Continued)

OTHER PUBLICATIONS

Philippot, B. Int'l Search Report, PCT/US0318267, Dec. 2, 2003.

(Continued)

*Primary Examiner*—Lesley D. Morris
*Assistant Examiner*—Paul Royal, Jr.
(74) *Attorney, Agent, or Firm*—Bromberg & Sunstein LLP (57) ABSTRACT

A personal transporter that provides both for propulsion by a user, and, at the same time, for dynamic stabilization by means of a powered actuator. A pitch variable such as pitch or time rate of change of pitch is sensed and used to determine the torque provided to a wheel, whether in a co-rotating or counter-rotating direction, in order to maintain stability of the transporter with respect to tipping in the fore-aft plane.

15 Claims, 7 Drawing Sheets

U.S. PATENT DOCUMENTS 6,527,071 B1 * 3/2003 Villedieu .................... 180/8.1

FOREIGN PATENT DOCUMENTS

JP 3070015 11/1997

OTHER PUBLICATIONS

Michael Reizeman, Electric Bicycle Helps Only Those Who Help Themselves, IEEE Spectrum, pp. 24-25, Apr. 2001.

Glynis Gordon, Dean Kamen Demonstrates Mind Over Matter, New Hampshire Magazine, pp. 12-15, 46, Oct. 1999.

Takahashi et al, Back and Forward Moving Scheme of Front Wheel Raising for Inverse Proceedings of 2001 IEEE International Conference on Robotics & Automation, Seoul, Korea, Wheel Chair Robot, pp. 3189-3194, May 21-26, 2001.

Takahashi et al, Front Wheel Raising and Inverse Pendulum Control of Power Assist Wheel Chair Robot, Proceedings of IEEE Industrial Electronics Society IECON '99, San Jose, CA, pp. 668-673, Nov. 28-Dec. 3, 1999.

Yamaha Wheelchair Business Ventures Overseas, Yamaha News Release, Mar. 11, 1999.

Yamaha News Release, JW-11C News Release, Apr. 12, 1999.

PAS, (Power Assist System) FAQS, Aug. 7, 2001.

How Does PAS Work? Yamaha Motor Co., Aug. 7, 2001.

Release of the Yamaha PAS Business, Yamaha News Release Aug. 27, 1999.

Release of the Yamaha Electro-Hybrid Bicycle "PAS Smile", Yamaha News Release, Jan. 15, 2001.

Release of Three Models of the New Yamaha Yamaha News Release, Electro-Hybrid Bicycle PAS SuperLight, Mar. 15, 2001.

JW-II Wins Health-Care Industry Award, Yamaha Motor Co., Aug. 7, 2001.

* cited by examiner

HYBRID HUMAN/ELECTRIC POWERED VEHICLE

The present application claims priority from U.S. provisional application No. 60/387,641, filed Jun. 11, 2002 and hereby incorporated by reference.

TECHNICAL FIELD

The present invention relates to control of an unstable vehicle and, more particularly, to dynamic stabilization of a vehicle propelled at least in part by a user.

BACKGROUND ART

Propulsion of a person by means of a balancing vehicle entails two components: The first is that of supplying power to effectuate locomotion, while the second is that of maintaining balance. Balance, as used herein, refers to maintaining stability in the fore-aft plane (defined, in turn, by the direction of motion and the vertical). The functions of propulsion and of balance are typically provided either by the user (as in the case of a unicycle, for example) or by a motor in conjunction with a controller (as in the case of the human transporter described in U.S. Pat. No. 5,701,965, which is incorporated herein by reference.)

While specialized skills are typically required for a person to maintain fore-aft balance on an unstable vehicle, only a small portion of the power exerted to achieve locomotion is necessary for the balancing function. Such skills are not trivial and often become diminished with age. Consequently, supplementing the balancing ability of a rider is a desirable aim.

SUMMARY OF THE INVENTION

In accordance with preferred embodiments of the invention, a personal transporter is provided that may be propelled by a user. The personal transporter has a platform for supporting the user, and a ground-contacting module that, in turn, has a first ground-contacting element movable about an axis for propelling the platform with respect to an underlying surface. Furthermore, the transporter has a power train for coupling power from the user to the ground-contacting element for impelling the ground-contacting element about its axis and a first sensor for sensing a value of a pitch variable of the personal transporter. A powered actuator provides torque to the ground-contacting element in addition to any torque provided by the user while a controller governs the powered actuator based at least on the value of the pitch variable in such a manner as to maintain stable operation of the personal transporter in an operating position that would be unstable with respect to tipping in the fore-aft plane but for provision of torque to the ground-contacting element.

In accordance with another embodiment of the invention, the personal transporter may include a second ground-contacting element and may include a second sensor for sensing the speed of the first ground-contacting element with respect to the underlying surface and a third sensor for sensing the speed of the second ground-contacting element with respect to the underlying surface.

In accordance with other embodiments of the invention, the platform may be a seat, the ground-contacting element may be a wheel, and the powered actuator may include a motor. The sensor may include an inclinometer and a gyroscope.

In accordance with other aspects of the invention, a method is provided for propelling a personal transporter having a wheel and a power train for conveying power from a user to the wheel. The method has the steps of:
a. sensing a value of a pitch variable of the personal transporter in the fore-aft plane with respect to gravity; and
b. providing torque to the wheel, based at least on the value of the pitch variable of the personal transporter, in addition to any torque provided by the user, in such a manner as to maintain stable operation of the personal transporter in an operating position that would be unstable with respect to tipping in the fore-aft plane but for provision of torque to the wheel.

In accordance with an additional aspect of the invention, a method is provided for propelling a personal transporter having wheels and a power train for conveying power from a user to the wheels. The method has the steps of:
a. sensing a value of a pitch variable of the personal transporter in the fore-aft plane with respect to gravity;
b. sensing a value of a rate of rotation for each wheel; and
c. providing torque to the wheels, based at least on the value of the pitch variable of the personal transporter and on the values of the rates of wheel rotation, in addition to any torque provided by the user, in such a manner as to maintain stable linear operation of the personal transporter in an operating position that would be unstable with respect to tipping in the fore-aft plane but for provision of torque to the wheel.

In accordance with still other aspects of the invention, sensing the value of the pitch variable may include measuring the pitch and/or the time rate of change of the pitch.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

As used in this description and any accompanying claims, the term "wheelie" will refer to a mode of operation of a vehicle otherwise having a normally stable mode of operation in which mode the vehicle contacts the underlying surface at an insufficient number of points to provide stability. Certain wheels of the vehicle and feet of the user are typically suspended above the surface in this mode.

Figure 1:
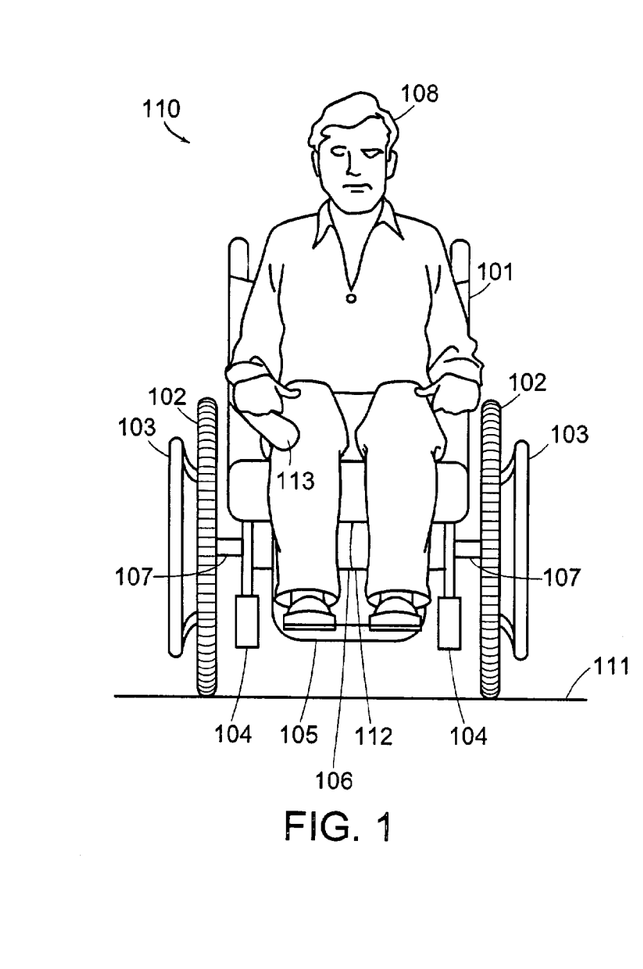
FIG. 1 is a front view of a simplified embodiment of the present invention.
Figure 2:
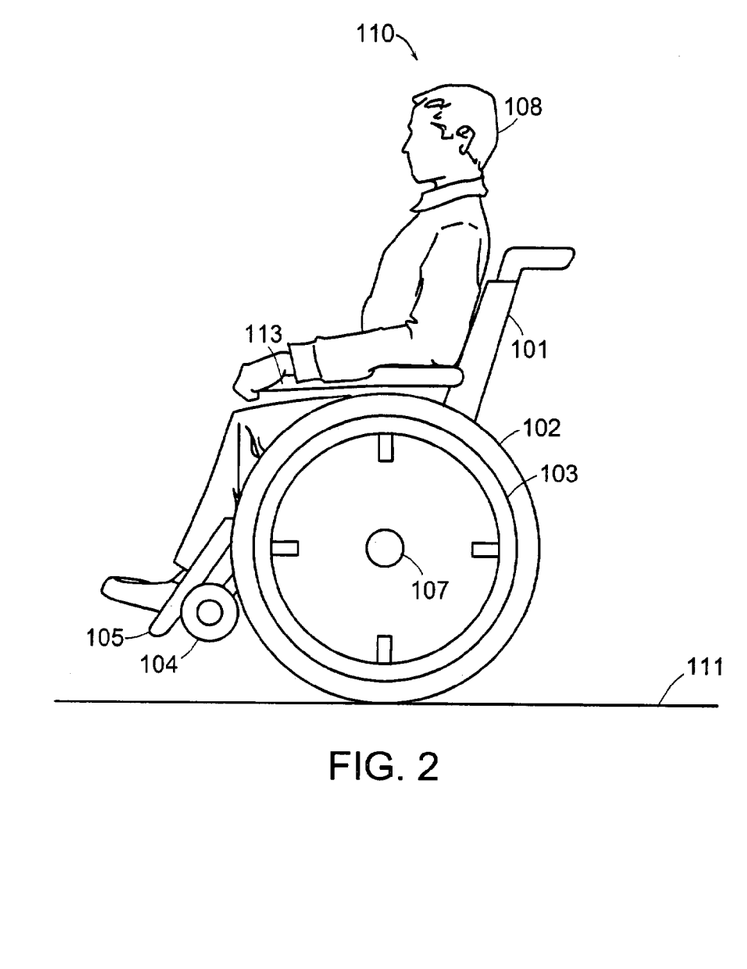
FIG. 2 is a side view of a simplified embodiment of the present invention.

Referring first to FIG. 1, a wheelchair 110 is shown employing one embodiment of the present invention. Wheelchair 110 includes seat 101 and footrest 105 to carry user 108, driven wheels 102 that suspend the user above surface 111, handrails 103 to permit the user to propel the chair, motors 107 to provide assistance to propulsion, and casters 104 to permit, when deployed, the wheelchair to rest stably on the surface 111 at more than two areas of contact. A power train allows power to be delivered, using any mechanical means, from the user's musculature to one or more ground-contacting elements, whether by means of linkages, gears, or in any other way. When the wheelchair is dynamically stabilized in accordance with embodiments of the invention, the casters may be retracted. Wheelchair 110 is shown by way of example only and without limitation, and it is to be understood that any personal transporter capable of coupling user-derived power in order to contribute to propulsion of the transporter is within the scope of the present invention. FIG. 2 shows a side view of the embodiment of FIG. 1.

Also attached to the wheelchair are controller 106, sensors 112, and input device 113. The input device 113 can include force-sensing mechanisms on handrails 103, a joystick, or other input device that allows the user to turn dynamic stabilization and power assistance on and off and to alter the degree of dynamic stabilization and power assistance. A pitch sensor such as an inclinometer or gyroscope provides the inclination of the wheelchair with respect to gravity and/or the time rate of change of the inclination. Other pitch sensors such as accelerometers, pendulous reference sensors, and distance probes may be used, as noted in, but not limited by, U.S. Pat. No. 6,332,103, incorporated herein by reference. A wheel rotation sensor such as an encoder attached to a motor or wheelchair wheel provides the rate of rotation of the wheelchair wheel.

Controller 106 accepts inputs of wheelchair inclination and/or rate of change of inclination from the pitch sensor and wheel rotation from the wheel rotation sensors and provides commands altering the torque of the motors 107 driving the wheels 102. As a result, wheelchair 110 accelerates or decelerates so as to maintain balance on two wheels without canceling lean unless the transporter is stationary.

Figure 3:
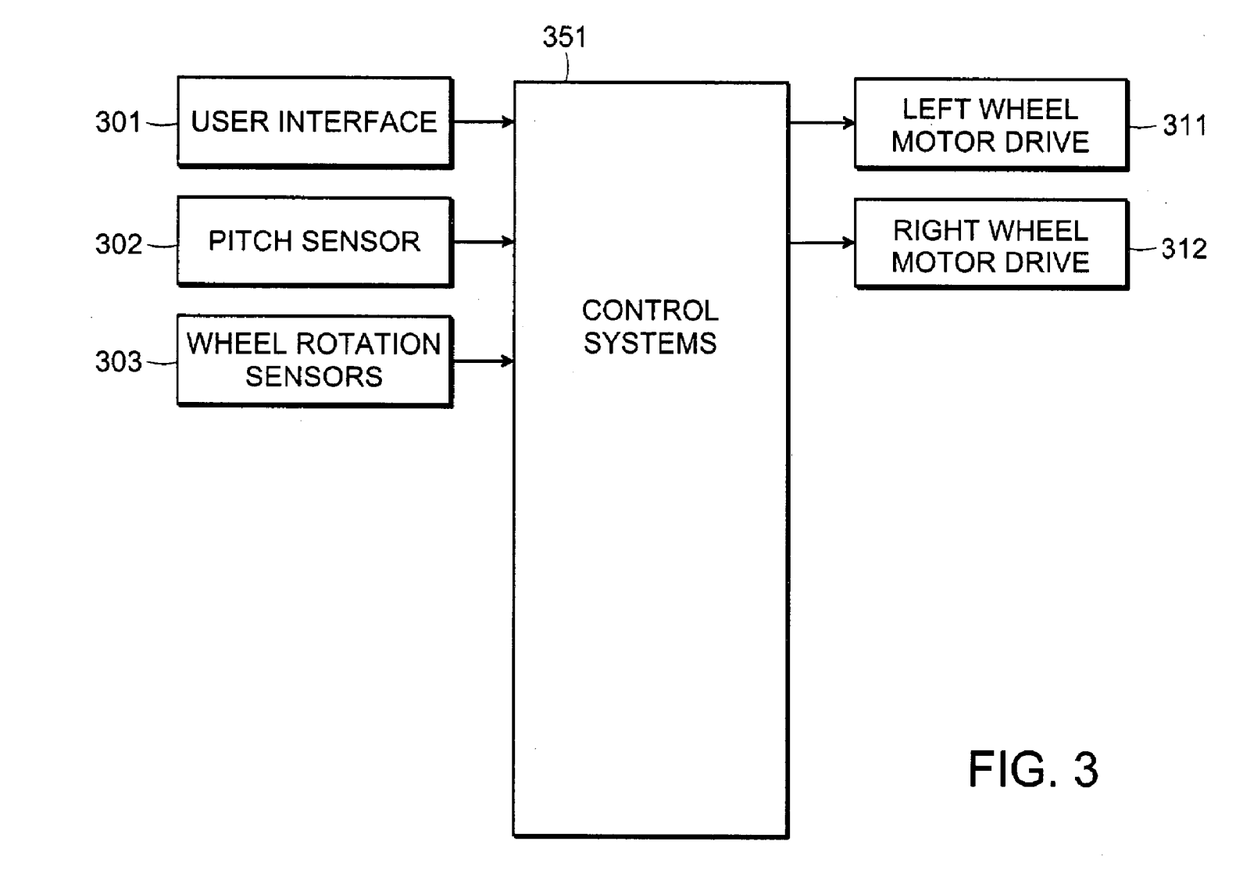
FIG. 3 is a block diagram showing generally the nature of power and control with the embodiment of FIG. 1.

In the block diagram of FIG. 3, it can be seen that a control system 351 is used to control the motor drives 311 and 312 of the embodiment of FIG. 1 to achieve locomotion and balance. Motor drives 311 and 312 apply torque to left and right wheels respectively. The control system has data inputs including user interface 301, pitch sensor 302 for sensing fore-aft pitch, and wheel rotation sensors 303.

Figure 4:
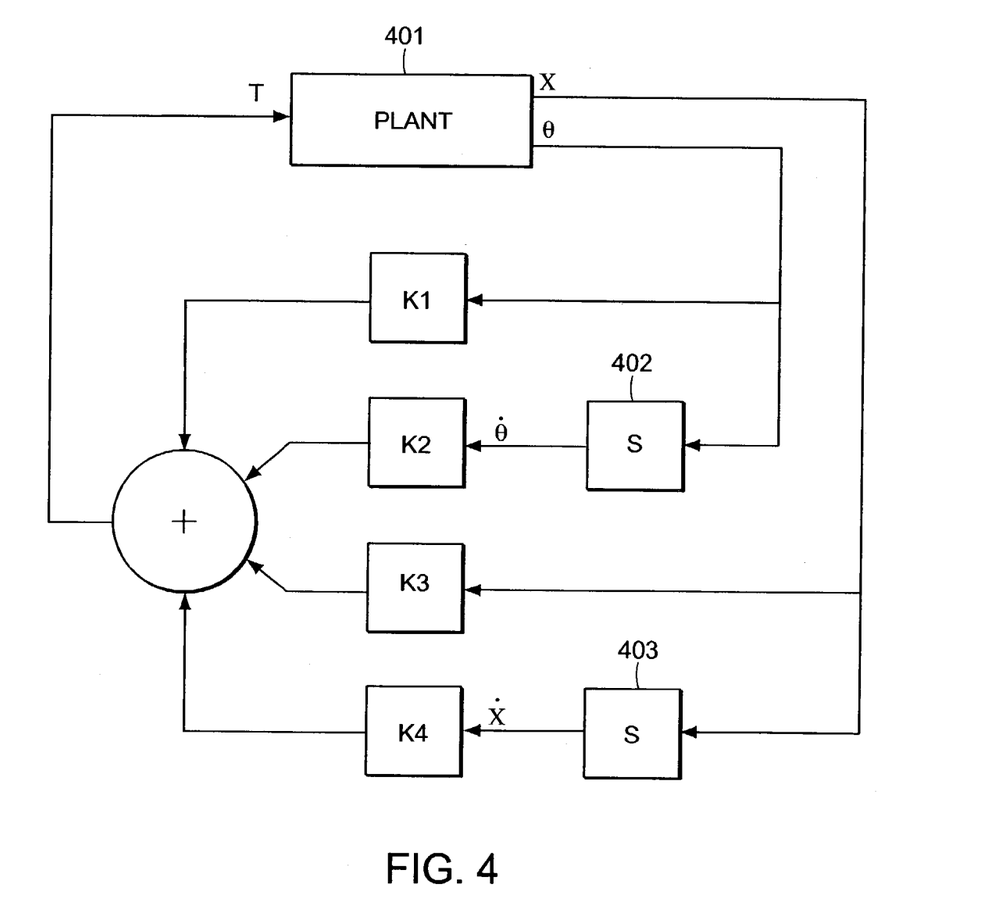
FIG. 4 illustrates the control strategy for a simplified version of FIG. 1 to achieve balanced operation using wheel torque.

A simplified control algorithm for maintaining balance in the embodiment of the invention according to FIG. 1 when the driven wheels 102 are active for locomotion is shown in the block diagram of FIG. 4. Plant 401 represents the actuation mechanism for driving a vehicle or transporter with a motor, before the control loop is applied. T identifies the wheel torque. The character θ identifies the fore-aft inclination (the pitch angle of the transporter with respect to gravity, i.e., the vertical), x identifies the fore-aft displacement along the surface relative to the reference point, and the dot over a character denotes a variable differentiated with respect to time. Rate gyros may be used to obtain $\dot{\theta}$ directly. The remaining portion of the figure is the control used to maintain balance. Boxes 402 and 403 indicate differentiation. To achieve dynamic control for providing dynamic stability of the system, the wheel torque T in this embodiment is set to satisfy the following equation:

$$T = K_1(\theta_0 - \theta) + K_2(\dot{\theta}_0 - \dot{\theta}) + K_3(x_o - x) + K_4(\dot{x} - \dot{x}_o),$$

where:
T denotes a torque applied to a ground-contacting element about its axis of rotation;
θ is a quantity corresponding to the lean of the entire system about the ground contact, with $\theta_0$ representing the magnitude of a system pitch offset, all as discussed in detail below;
x identifies the fore-aft displacement along the surface relative to a fiducial reference point, with $x_0$ representing the magnitude of a specified fiducial reference offset;
a dot over a character denotes a variable differentiated with respect to time; and
a subscripted variable denotes a specified offset that may be input into the system as described below; and
$K_1$, $K_2$, $K_3$, and $K_4$ are gain coefficients that may be configured, either in design of the system or in real-time, on the basis of a current operating mode and operating conditions as well as preferences of a user. The gain coefficients may be of a positive, negative, or zero magnitude, affecting thereby the mode of operation of the vehicle, as discussed below. The gains $K_1$, $K_2$, $K_3$, and $K_4$ are dependent upon the physical parameters of the system and other effects such as gravity. The simplified control algorithm of FIG. 4 may maintain balance and also proximity to the reference point on the surface in the presence of disturbances such as changes to the system's center of mass with respect to the reference point on the surface due to body motion of the subject or contact with other persons or objects.

The size of $K_3$ determines the extent to which the transporter will seek to return to a given location. With a non-zero $K_3$, the effect of $x_0$ is to produce a specified offset $x_0$ from the fiducial reference by which x is measured. When $K_3$ is zero, the transporter has no bias to return to a given location. The consequence of this is that if the transporter is caused to lean in a forward direction, the transporter will move in a forward direction, thereby maintaining balance. Such a configuration is discussed further below.

The term "lean" is often used with respect to a system balanced on a single point of a perfectly rigid member. In that case, the point (or line) of contact between the member and the underlying surface has zero theoretical width. In that case, furthermore, lean may refer to a quantity that expresses the orientation with respect to the vertical (i.e., an imaginary line passing through the center of the earth) of a line from the center of gravity (CG) of the system through the theoretical line of ground contact of the wheel. While recognizing, as discussed above, that an actual ground-contacting member is not perfectly rigid, the term "lean" is used herein in the common sense of a theoretical limit of a rigid ground-contacting member. The term "system" refers to all mass caused to move due to motion of the ground-contacting elements with respect to the surface over which the transporter is moving.

"Stability" as used in this description and in any appended claims refers to the mechanical condition of an operating position with respect to which the system will naturally return if the system is perturbed away from the operating position in any respect.

The gains $K_1$, $K_2$, $K_3$, and $K_4$ are dependent upon the physical parameters of the system and other effects such as gravity. The control algorithm of FIG. 4 maintains balance in the presence of disturbances such as changes to the system's center of mass with respect to the reference point on the surface due to body motion of the subject or contact with other persons or objects.

In order to accommodate two wheels instead of the one-wheel system illustrated in FIG. 4, the torque desired from the left motor and the torque desired from the right motor can be calculated separately in the general manner described below with reference to FIG. 8. Additionally, tracking both the left wheel motion and the right wheel motion permits adjustments to be made to prevent unwanted turning of the device and to account for performance variations between the two drive motors or uneven underlying surfaces.

With respect to forward and reverse motion, leaning forward or backward from the inclination associated with a stationary wheelie would lead to motor assistance for movement as a wheelie in the forward or backward direction in an attempt to compensate for an inclination change detected by the pitch sensor (measuring θ). A manual interface such as joystick or force sensing hand rim may be used in certain embodiments to adjust desired wheel velocity or the desired pitch.

It can be seen that the approach of adjusting motor torques permits fore-aft stability to be achieved without the necessity of additional stabilizing wheels or struts (although such aids to stability may be provided). In other words, stability is achieved dynamically, by motion of the components of the device (in this case constituting the entire device) relative to the ground.

Figure 5:
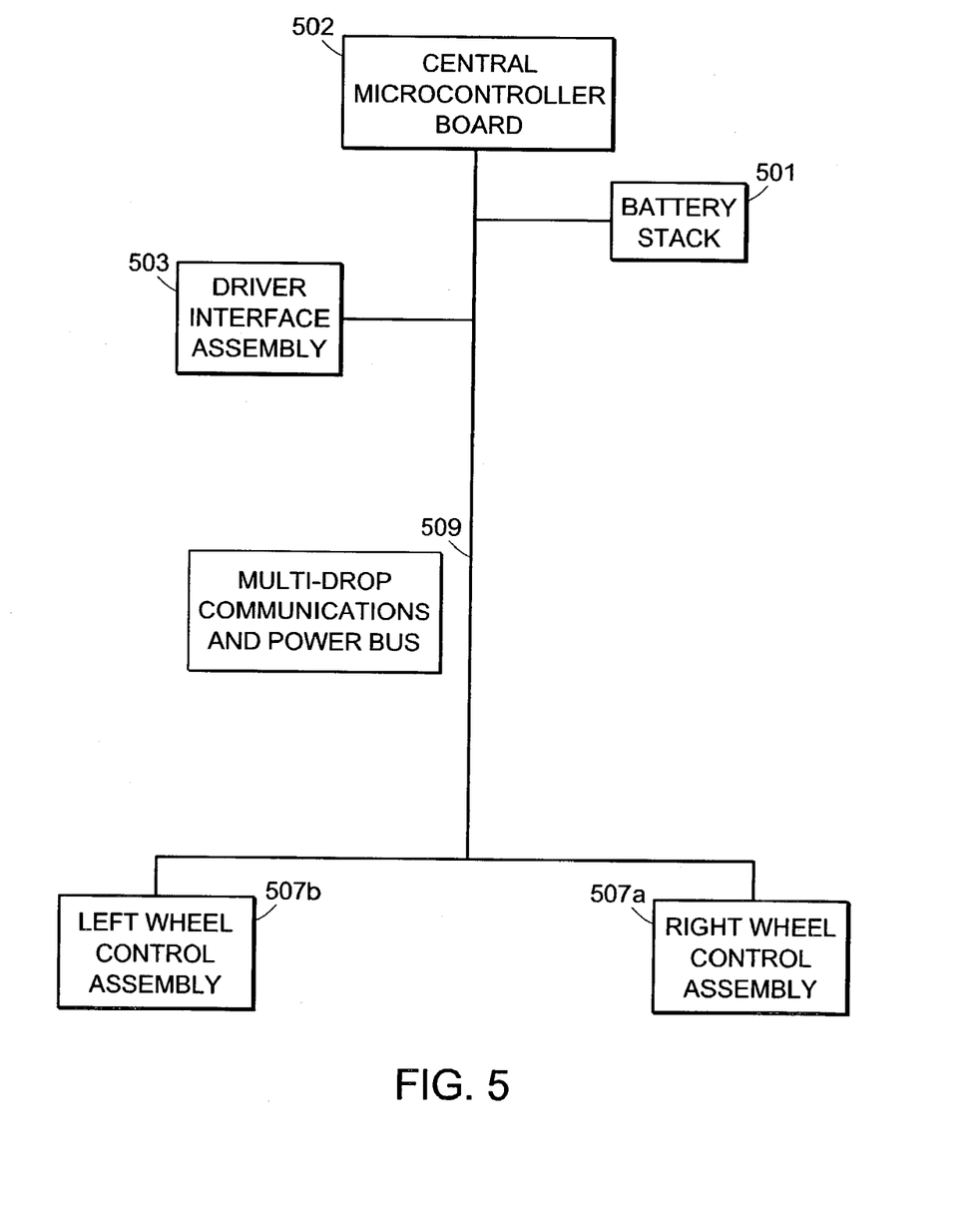
FIG. 5 is a block diagram showing communication among the control assemblies used in the embodiment of FIG. 1.

FIG. 5 is a block diagram showing communication among the control assemblies used in a device such as that depicted in FIG. 1. The device may be powered, for example, by battery stack 501. Bus 509 provides communications (here implemented serially) among and power to the various assemblies (507a and 507b). Overall system control of the device is provided by central microcontroller board 502. Inputs, derived from sources such as the joystick and pitch sensor, to the central microcontroller board 502 that establishes the basis for system control are provided by the driver interface assembly 503, which is described below in connection with FIG. 7.

Figure 6:
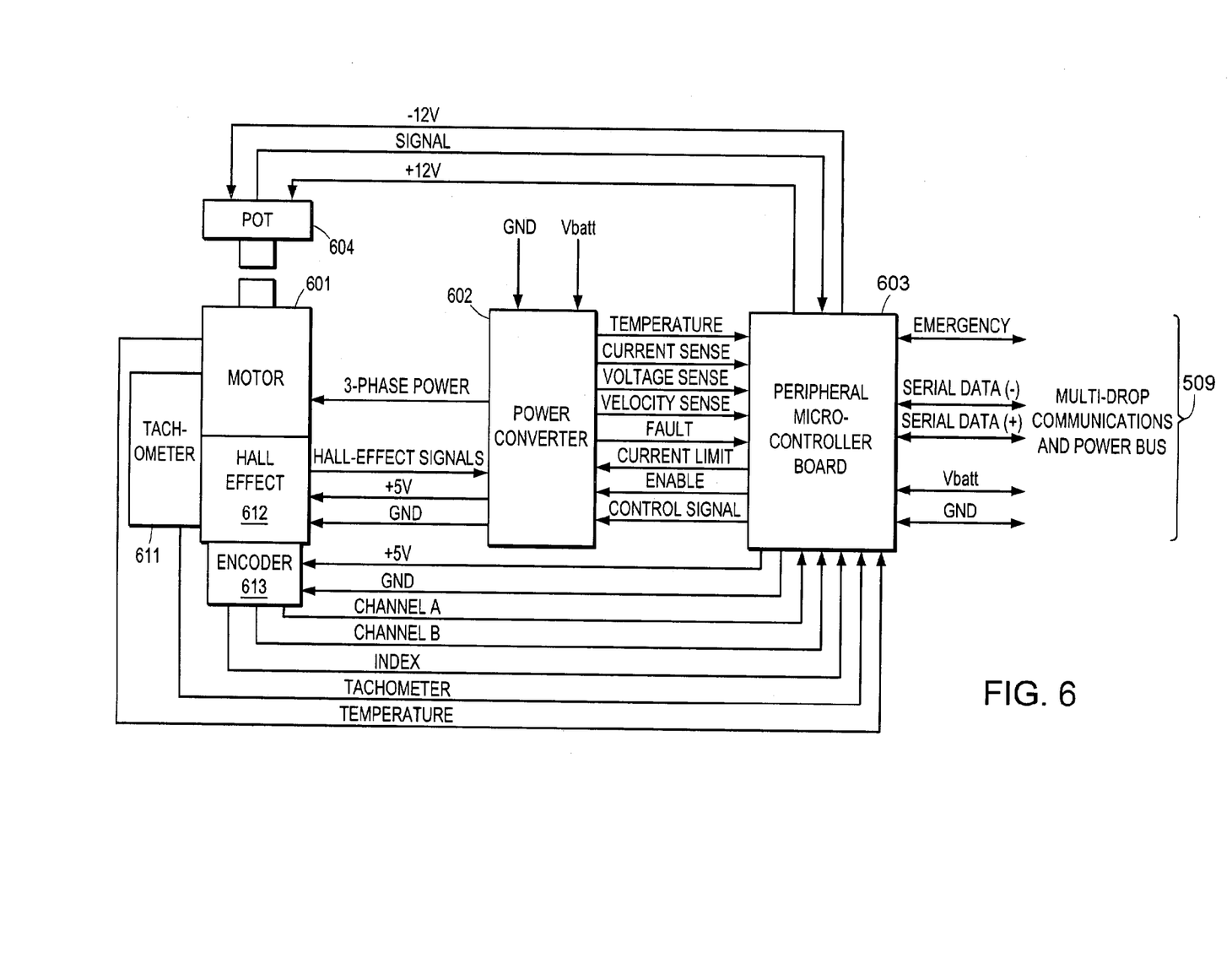
FIG. 6 is a block diagram showing the structure of a generic control assembly of the type used in the embodiment of FIG. 5.

The general structure of the left and right wheel control assemblies, identified in FIG. 5, used for the wheelchair attitude, is shown in FIG. 6. A motor 601 receives 3-phase power from power converter 602. An output from Hall effect sensor 612 provides information signals to the power converter 602 to control the phase of power to the motor. Information signals relating to the shaft rotation of the motor 601 or of the position of mechanical systems powered by the motor 601 may be provided by one or more of potentiometer 604, tachometer 611, or incremental encoder 613. (Alternatively, the Hall effect sensor 612 may itself be utilized.) These signals are fed to peripheral microcontroller board 603. Additionally, temperature outputs associated with power converter 602 and motor 601 provide input signals to the peripheral microcontroller board 603. The peripheral microcontroller board 603 is in turn in communication with the central microcontroller board 502 over bus 509.

Figure 7:
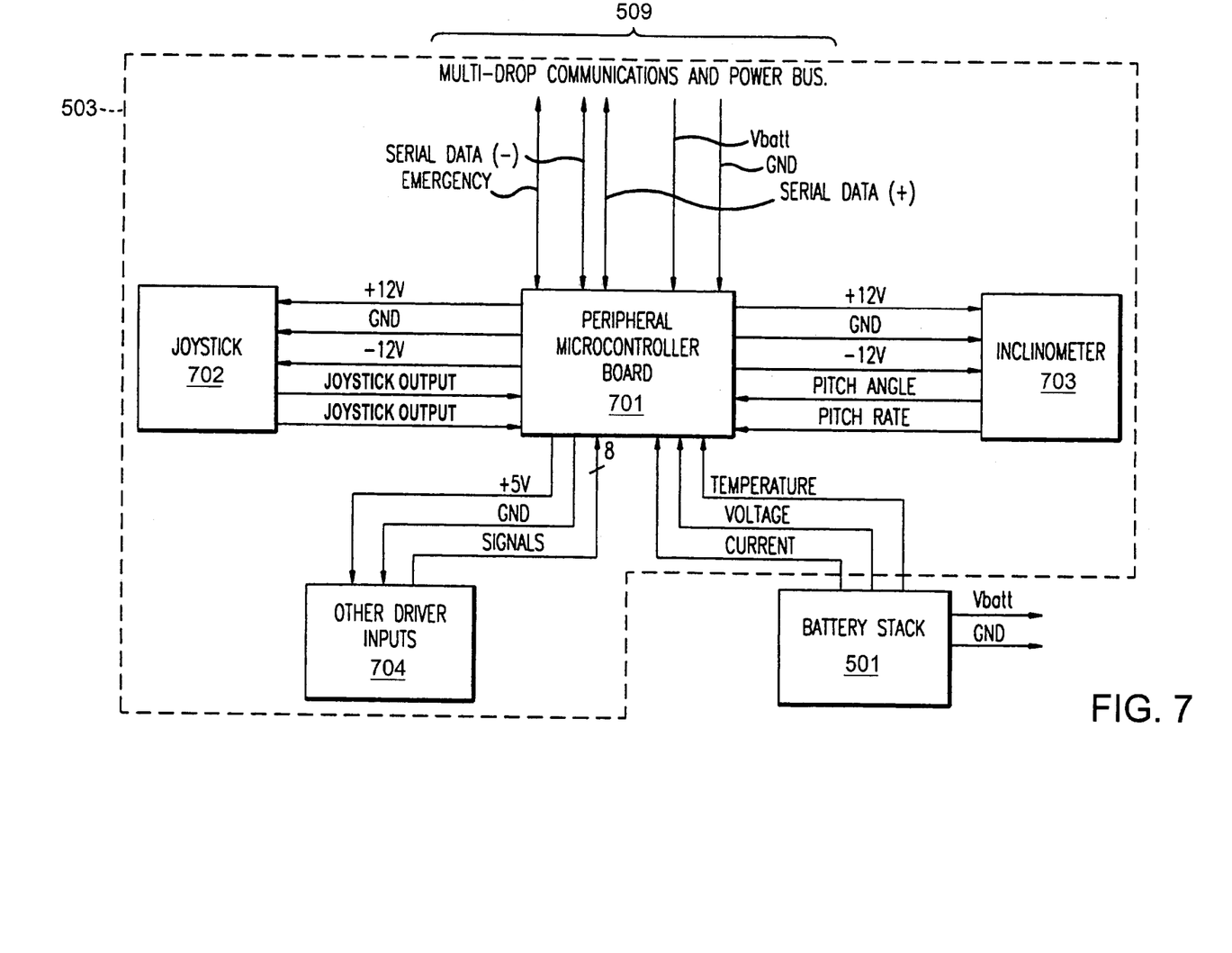
FIG. 7 is a block diagram showing providing detail of the driver interface assembly 503 of the type used in the embodiment of FIG. 5.

FIG. 7 is a block diagram providing detail of the driver interface assembly 503 of FIG. 5. A peripheral microcomputer board 701 receives input from joystick 702 as well as from pitch sensor 703. The pitch sensor provides information signals as to pitch and/or pitch rate. Other inputs 704 may also be desirably provided as an input to the peripheral microcontroller board 701. Such other inputs may include signals gated by switches (knobs and buttons) for determining the mode of operation (such as lean mode or balance mode, in the case of a cluster-wheeled transporter, as described in U.S. Pat. No. 5,701,965). The peripheral microcontroller board 701 has inputs for receiving signals from the battery stack 501 as to battery voltage, battery current, and battery temperature. The peripheral microcontroller board 701 is in communication over bus 509 with central microcontroller board 502.

Figure 8:
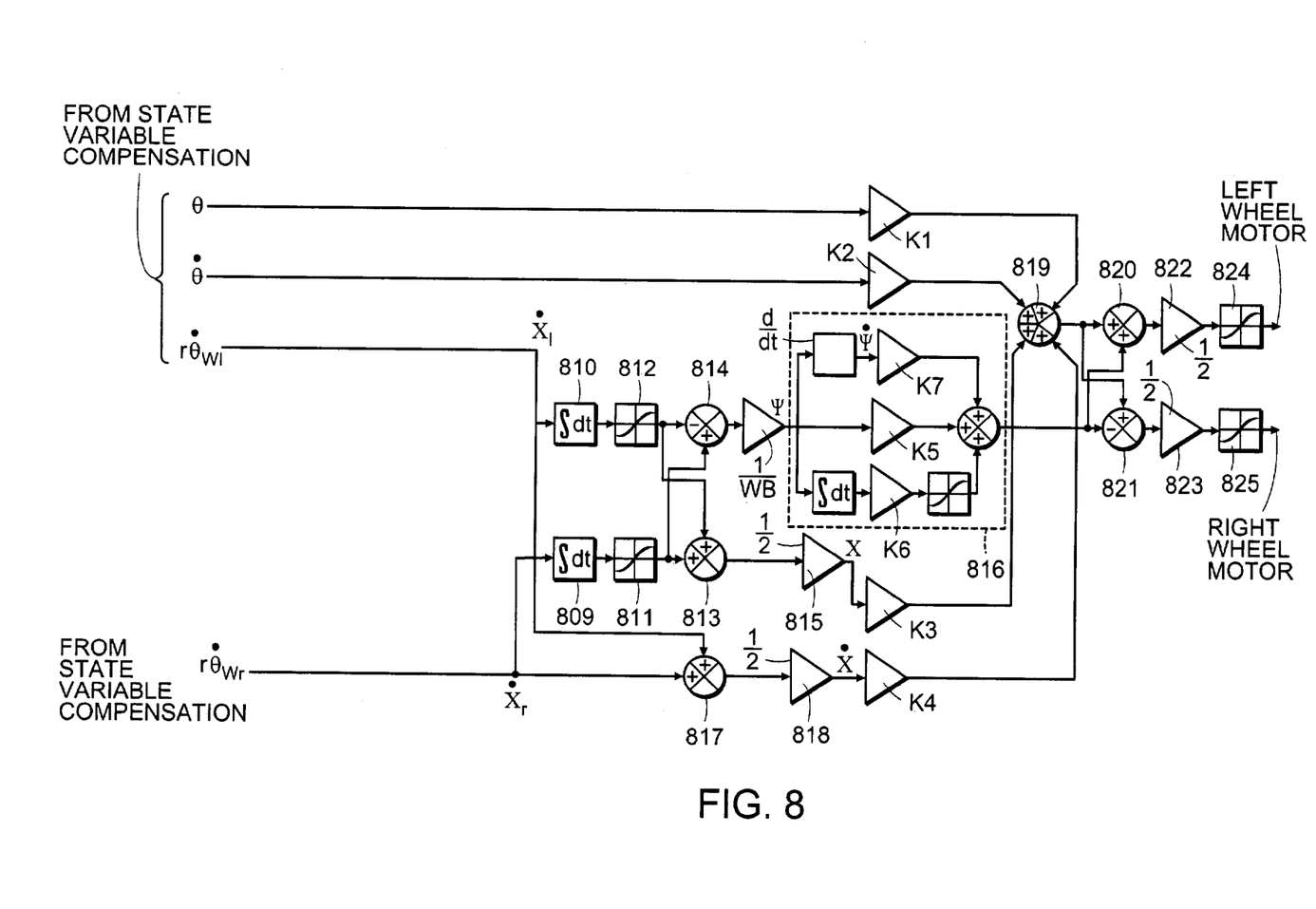
FIG. 8 is a schematic of the wheel motor control during balancing and normal locomotion of the embodiment of FIG. 1.

FIG. 8 shows the control arrangement for the motors of the right and left wheels (corresponding to items 107 of FIG. 1). The arrangement has inputs of $r\dot{\theta}_{wl}$ (linear velocity of the left wheel relative to the world coordinate system) and $r\dot{\theta}_{wr}$ (linear velocity of the right wheel). Inputs θ, $\dot{\theta}$, and error signals x (described below), subject to gains $K_1$, $K_2$, $K_3$, and $K_4$ respectively, become inputs to summer 819, which produces the basic balancing torque command for the wheels, in the general manner described above in connection with FIG. 4 above. The output of summer 819 is combined with the output of the yaw PID loop 816 (described below) in summer 820, then divided in divider 822 and limited in saturation limiter 824, to produce the left wheel torque command. Similarly, the output of summer 819 is combined with the output of PID loop 816 in summer 821, then divided in divider 823 and limited in saturation limiter 825, to produce the right wheel torque command.

The average of the compensated linear velocity input signals $r\dot{\theta}_{wl}$ and $r\dot{\theta}_{wr}$, determined via summer 817 and divider 818, produces a linear velocity error signal $\dot{x}$. Displacement error signal x is derived by integrating $r\dot{\theta}_{wl}$ and $r\dot{\theta}_{wr}$ in integrators 810 and 809, limiting the results in saturation limiters 812 and 811, and then averaging their outputs via summer 813 and divider 815. The difference between these displacements determined via summer 814, produces the yaw error signal ψ.

The yaw error signal ψ is run through a standard proportional-plus-integral-plus-derivative (PID) control loop 816, the output of which is combined with the output of the basic balancing torque command of summer 819 to produce the individual wheel torque commands, which cause the wheels to maintain fore-aft stability and also cause the wheelchair to maintain a forward direction of travel.

The controller accepts inputs of wheelchair inclination or rate of change of inclination from the pitch sensor and wheel rotation from the wheel rotation sensors and provides commands altering the braking of the manually driven wheels. As a result, the wheelchair accelerates or decelerates so as to maintain balance on two wheels.

While FIG. 8 shows control algorithms schematically, they may be implemented in a number of embodiments including the use of analog control algorithms or microprocessor programmed digital control, both wholly within the scope of the present invention.

Having thus described various illustrative embodiments of the present invention, some of its advantages and optional features, it will be apparent that such embodiments are presented by way of example only and are not by way of limitation. Those skilled in the art could readily devise alternations and improvements on these embodiments, as well as additional embodiments, without departing from the spirit and scope of the invention. All such modifications are within the scope of the invention as claimed.

What is claimed is:

1. A personal transporter propelled by a user, the personal transporter comprising:
   a. a platform for supporting the user;
   b. a ground-contacting module having a first ground-contacting element movable about an axis for propelling the platform with respect to an underlying surface;
   c. a power train for coupling power through solely mechanical means from the user to the ground-contacting element for impelling the ground-contacting element about its axis;
   d. a first sensor for sensing a value of a pitch variable of the personal transporter;
   e. a powered actuator for providing torque to the ground-contacting element in addition to any torque provided by the user; and
   f. a controller for governing the powered actuator based at least on the value of the pitch variable in such a manner as to maintain stable operation of the personal transporter in an operating position that would be unstable with respect to tipping in the fore-aft plane but for provision of torque to the ground-contacting element.

2. The personal transporter according to claim 1, wherein the platform is a seat.

3. The personal transporter according to claim 1, wherein the ground-contacting element is a wheel.

4. The personal transporter according to claim 1, wherein the powered actuator includes a motor.

5. The personal transporter according to claim 1, wherein the first sensor includes an inclinometer.

6. The personal transporter according to claim 1, wherein the first sensor includes a gyroscope.

7. The personal transporter according to claim 1, wherein the powered actuator includes a brake.

8. The personal transporter according to claim 1, further comprising a second ground-contacting element.

9. The personal transporter according to claim 8, further comprising a second sensor for sensing the speed of the first ground-contacting element with respect to the underlying surface and a third sensor for sensing the speed of the second ground-contacting element with respect to the underlying surface.

10. A method for propelling a personal transporter having a wheel and a power train for conveying power from a user to the wheel, the method comprising:
    a. sensing a value of a pitch variable of the personal transporter in the fore-aft plane with respect to gravity; and
    b. providing torque to the wheel, based at least on the value of the pitch variable of the personal transporter, in addition to a torque provided by the user through solely mechanical means, in such a manner as to maintain stable operation of the personal transporter in an operating position that would be unstable with respect to tipping in the fore-aft plane but for provision of torque to the wheel.

11. The method according to claim 10, wherein the step of sensing the value of the pitch variable includes measuring the pitch.

12. The method according to claim 10, wherein the step of sensing the value of the pitch variable includes measuring the time rate of change of the pitch.

13. The method according to claim 10, wherein provision of torque to the wheel does not cancel out pitch under normal conditions of locomotion.

14. The method according to claim 10, wherein the step of providing torque to the wheel includes providing braking to the wheel, in addition to any braking provided by the user.

15. A method for propelling a personal transporter having wheels and a power train for conveying power from a user to the wheels, the method comprising:
    a. sensing a value of a pitch variable of the personal transporter in the fore-aft plane with respect to gravity;
    b. sensing a value of a rate of rotation for each wheel; and
    c. providing torque to the wheels, based at least on the value of the pitch variable of the personal transporter and on the values of the rates of wheel rotation, in addition to a torque provided by the user through solely mechanical means, in such a manner as to maintain stable linear operation of the personal transporter in an operating position that would be unstable with respect to tipping in the fore-aft plane but for provision of torque to the wheels.

* * * * *